ated: Apr. 23, 2019

United States Patent
Nakashima

(10) Patent No.: US 10,266,682 B2
(45) Date of Patent: Apr. 23, 2019

(54) CROSS-LINKED RUBBER FOR LIQUEFIED GAS SEAL

(71) Applicant: ZEON CORPORATION, Tokyo (JP)

(72) Inventor: Tomonori Nakashima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/321,925

(22) PCT Filed: Jun. 23, 2015

(86) PCT No.: PCT/JP2015/067985
§ 371 (c)(1),
(2) Date: Dec. 23, 2016

(87) PCT Pub. No.: WO2015/199058
PCT Pub. Date: Dec. 30, 2015

(65) Prior Publication Data
US 2017/0152375 A1    Jun. 1, 2017

(30) Foreign Application Priority Data

Jun. 26, 2014  (JP) ................. 2014-131584

(51) Int. Cl.
| | | |
|---|---|---|
| C08L 77/00 | (2006.01) | |
| C08L 15/00 | (2006.01) | |
| C09K 3/10 | (2006.01) | |
| C08L 33/20 | (2006.01) | |
| F16J 15/02 | (2006.01) | |
| C08L 9/02 | (2006.01) | |

(52) U.S. Cl.
CPC .............. C08L 15/005 (2013.01); C08L 9/02 (2013.01); C08L 33/20 (2013.01); C08L 77/00 (2013.01); C09K 3/10 (2013.01); F16J 15/022 (2013.01); *C08L 2205/025* (2013.01); *C08L 2205/03* (2013.01); *C08L 2312/00* (2013.01)

(58) Field of Classification Search
None
See application file for complete search history.

(56) References Cited

U.S. PATENT DOCUMENTS

2014/0065336 A1    3/2014  Nakashima et al.

FOREIGN PATENT DOCUMENTS

| CN | 103443188 A | 12/2013 |
|---|---|---|
| EP | 2 692 788 A1 | 2/2014 |
| JP | 2003-313539 A | 11/2003 |
| JP | WO 2012/133618 A1 * | 10/2012 |

OTHER PUBLICATIONS

Sep. 15, 2015 International Search Report issued in International Patent Application No. PCT/JP2015/067985.
Jan. 19, 2018 Extended Search Report issued in European Patent Application No. 15810964.5.

* cited by examiner

*Primary Examiner* — Ana L. Woodward
(74) *Attorney, Agent, or Firm* — Oliff PLC

(57) ABSTRACT

A rubber obtained by cross-linking a highly saturated nitrile rubber composition has a carboxyl group-containing highly saturated nitrile rubber (A1) containing 15 to 60 wt % of $\alpha,\beta$-ethylenically unsaturated nitrile monomer units and 1 to 60 wt % of $\alpha,\beta$-ethylenically unsaturated dicarboxylic acid monoester monomer units and having an iodine value $\leq 120$, a highly saturated nitrile rubber (A2) containing $\alpha,\beta$-ethylenically unsaturated nitrile monomer units in 15 to 60 wt %, having a content of $\alpha,\beta$-ethylenically unsaturated dicarboxylic acid monoester monomer units of 0.9 wt % or less, and an iodine value of 120 or less, a polyamide resin having a melting point $\geq 150°$ C., and a cross-linking agent. In the composition, a weight ratio of "(A1):(A2)" is 5:95 to 95:5 in range, a weight ratio of "total of (A1) and (A2):polyamide resin" is 95:5 to 50:50, and a storage elastic modulus of the cross-linked rubber at 150° C. is 5 MPa or more.

13 Claims, No Drawings

CROSS-LINKED RUBBER FOR LIQUEFIED GAS SEAL

TECHNICAL FIELD

The present invention relates to a cross-linked rubber used for a liquefied gas seal application.

BACKGROUND ART

In the past, highly saturated nitrile rubber obtained by hydrogenating the butadiene part of nitrile rubber (acrylonitrile-butadiene copolymer rubber) has been known to exhibit excellent resistance to liquefied gas such as fluorohydrocarbon and carbon dioxide (liquefied gas resistance) and has been utilized as a fluorohydrocarbon seal member, carbon dioxide seal member, etc. of a refrigerant of refrigerating machines and air-conditioners.

On the other hand, an air-conditioning use refrigerating machine sometimes has a maximum temperature reaching as much as 140 to 150° C., so the rubber material used for it is required to have a 150° C. or more heat resistance. Further, as one important physical property of a seal member for a refrigerating machine, it is required that even if rendered a high temperature state after being made to contact a refrigerant of fluorohydrocarbon or carbon dioxide (seal member contacts fluorohydrocarbon or carbon dioxide in state of liquefied gas), the rubber not blister or crack.

In view of such a situation, for example, Patent Document 1 discloses a rubber composition for forming a seal member used for sealing a fluid at a pressure of 0.1 MPa to 15 MPa and containing hydrogenated carboxylated nitrile rubber. However, the cross-linked rubber obtained using the rubber composition described in Patent Document 1 was not sufficient in compression set resistance. In particular, when used for a seal member application for a refrigerating machine, it is necessary to hold a high pressure and further to repeatedly raise and lower the pressure, so even more than the past, excellent mechanical strength such as tensile strength and elongation and low compression set are being demanded. As opposed to this, the art of Patent Document 1 was not able to sufficiently meet this demand. In addition, the cross-linked rubber obtained using the rubber composition described in Patent Document 1 was excessively high in hardness and therefore the assembly ability and sealability when used as a seal member were inferior.

RELATED ART

Patent Documents

Patent Document 1: Japanese Patent Publication No. 2003-313539A

SUMMARY OF THE INVENTION

Problem to be Solved by the Invention

The present invention was made in view of such an actual situation and has as its object the provision of a cross-linked rubber for a liquefied gas seal excellent in mechanical strength, liquefied gas resistance, compression set resistance, and refrigerating machine oil resistance.

Means for Solving the Problem

The inventors engaged in intensive research to achieve the above object and as a result discovered that the above object can be achieved by a cross-linked rubber which is obtained by using a rubber composition comprising a carboxyl group-containing highly saturated nitrile rubber (A1) containing 1 to 60 wt % of $\alpha,\beta$-ethylenically unsaturated dicarboxylic acid monoester monomer units, highly saturated nitrile rubber (A2) with a content of $\alpha,\beta$-ethylenically unsaturated dicarboxylic acid monoester monomer units of 0.9 wt % or more, and a polyamide resin (B) with a melting point of 150° C. or more in a specific ratio and a cross-linking agent (C) and cross-linking the rubber composition and which has a storage elastic modulus E' at 150° C. of 5 MPa or more and thereby completed the present invention.

That is, according to the present invention, there is provided a cross-linked rubber for a liquefied gas seal obtained by cross-linking a highly saturated nitrile rubber composition comprising a carboxyl group-containing highly saturated nitrile rubber (A1) containing 15 to 60 wt % of $\alpha,\beta$-ethylenically unsaturated nitrile monomer units and 1 to 60 wt % of $\alpha,\beta$-ethylenically unsaturated dicarboxylic acid monoester monomer units and having an iodine value of 120 or less, a highly saturated nitrile rubber (A2) containing $\alpha,\beta$-ethylenically unsaturated nitrile monomer units in 15 to 60 wt %, having a content of $\alpha,\beta$-ethylenically unsaturated dicarboxylic acid monoester monomer units of 0.9 wt % or less, and having an iodine value of 120 or less, a polyamide resin (B) having a melting point of 150° C. or more, and a cross-linking agent (C), wherein, in the highly saturated nitrile rubber composition, ratios of content of the carboxyl group-containing highly saturated nitrile rubber (A1), the highly saturated nitrile rubber (A2), and the polyamide resin (B) being a weight ratio of "carboxyl group-containing highly saturated nitrile rubber (A1): highly saturated nitrile rubber (A2)" of 5:95 to 95:5 in range and a weight ratio of "total of carboxyl group-containing highly saturated nitrile rubber (A1) and highly saturated nitrile rubber (A2):polyamide resin (B)" of 95:5 to 50:50, and a storage elastic modulus E' of the cross-linked rubber at 150° C. being 5 MPa or more.

In the cross-linked rubber for sealing liquefied gas of the present invention, preferably, in the highly saturated nitrile rubber composition, the ratio of content of the cross-linking agent (C) is 0.1 to 30 parts by weight with respect to 100 parts by weight of the total of the carboxyl group-containing highly saturated nitrile rubber (A1) and the highly saturated nitrile rubber (A2).

In the cross-linked rubber for sealing liquefied gas of the present invention, preferably the cross-linking agent (C) is an organoperoxide cross-linking agent.

In the cross-linked rubber for sealing liquefied gas of the present invention, preferably the highly saturated nitrile rubber composition is obtained by kneading the carboxyl group-containing highly saturated nitrile rubber (A1), the highly saturated nitrile rubber (A2), and the polyamide resin (B) at a temperature of 180° C. or more.

In the cross-linked rubber for sealing liquefied gas of the present invention, preferably the highly saturated nitrile rubber composition further comprises a filler.

In the cross-linked rubber for sealing liquefied gas of the present invention, preferably the filler is carbon black.

In the cross-linked rubber for sealing liquefied gas of the present invention, preferably the carbon black has an average particle size of 0.01 to 5 μm.

Further, according to the present invention, there is provided a liquefied gas seal member comprised of any of the cross-linked rubber described above.

Effects of Invention

According to the present invention, there is provided a cross-linked rubber for a liquefied gas seal excellent in mechanical strength, liquefied gas resistance, compression set resistance, and refrigerating machine oil resistance.

DESCRIPTION OF EMBODIMENTS

The cross-linked rubber for sealing liquefied gas of the present invention is a cross-linked rubber obtained by cross-linking the later explained highly saturated nitrile rubber composition and has a storage elastic modulus E' at 150° C. of 5 MPa or more.

Highly Saturated Nitrile Rubber Composition

First, the highly saturated nitrile rubber composition used for obtaining the cross-linked rubber for a liquefied gas seal of the present invention will be explained.

The highly saturated nitrile rubber composition used in the present invention contains a carboxyl group-containing highly saturated nitrile rubber (A1) containing 15 to 60 wt % of α,β-ethylenically unsaturated nitrile monomer units and 1 to 60 wt % of α,β-ethylenically unsaturated dicarboxylic acid monoester monomer units and having an iodine value of 120 or less, a highly saturated nitrile rubber (A2) containing α,β-ethylenically unsaturated nitrile monomer units in 15 to 60 wt %, having a content of α,β-ethylenically unsaturated dicarboxylic acid monoester monomer units of 0.9 wt % or less, and having an iodine value of 120 or less, a polyamide resin (B) having a melting point of 150° C. or more, and a cross-linking agent (C).

Carboxyl Group-Containing Highly Saturated Nitrile Rubber (A1)

The carboxyl group-containing highly saturated nitrile rubber (A1) used in the present invention is rubber containing 15 to 60 wt % of α,β-ethylenically unsaturated nitrile monomer units and 1 to 60 wt % of α,β-ethylenically unsaturated dicarboxylic acid monoester monomer units and having an iodine value of 120 or less. The carboxyl group-containing highly saturated nitrile rubber (A1) used in the present invention is obtained by copolymerizing an α,β-ethylenically unsaturated nitrile monomer, α,β-ethylenically unsaturated dicarboxylic acid monoester monomer, and another copolymerizable monomer added as needed.

The α,β-ethylenically unsaturated nitrile monomer is not particularly limited so long as an α,β-ethylenically unsaturated compound having a nitrile group. For example, acrylonitrile; α-halogenoacrylonitrile such as α-chloroacrylonitrile and α-bromoacrylonitrile; α-alkylacrylonitrile such as methacrylonitrile; etc. may be mentioned. Among these, acrylonitrile and methacrylonitrile are preferable, while acrylonitrile is more preferable. The α,β-ethylenically unsaturated nitrile monomer may be used as single types alone or as a plurality of types together.

The content of the α,β-ethylenically unsaturated nitrile monomer units is 15 to 60 wt % with respect to the total monomer units, preferably 18 to 55 wt %, more preferably 20 to 50 wt %. If the content of the α,β-ethylenically unsaturated nitrile monomer units is too small, the obtained cross-linked rubber is liable to decline in oil resistance and liquefied gas resistance, while conversely if too large, the cold resistance may fall.

As the α,β-ethylenically unsaturated dicarboxylic acid monoester monomer, maleic acid monoalkyl esters such as monomethyl maleate, monoethyl maleate, monopropyl maleate, and mono n-butyl maleate; maleic acid monocycloalkyl esters such as monocyclopentyl maleate, monocyclohexyl maleate, and monocycloheptyl maleate; maleic acid monoalkylcycloalkyl esters such as monomethylcyclopentyl maleate and monoethylcyclohexyl maleate; fumaric acid monoalkyl esters such as monomethyl fumarate, monoethyl fumarate, monopropyl fumarate, and mono n-butyl fumarate; fumaric acid monocycloalkyl esters such as monocyclopentyl fumarate, monocyclohexyl fumarate, and monocycloheptyl fumarate; fumaric acid monoalkylcycloalkyl esters such as monomethylcyclopentyl fumarate and monoethylcyclohexyl fumarate; citraconic acid monoalkyl esters such as monomethyl citraconate, monoethyl citraconate, monopropyl citraconate, and mono n-butyl citraconate; citraconic acid monocycloalkyl esters such as monocyclopentyl citraconate, monocyclohexyl citraconate, and monocycloheptyl citraconate; citraconic acid monoalkylcycloalkyl esters such as monomethylcyclopentyl citraconate and monoethylcyclohexyl citraconate; itaconic acid monoalkyl esters such as monomethyl itaconate, monoethyl itaconate, monopropyl itaconate, and mono n-butyl itaconate; itaconic acid monocycloalkyl esters such as monocyclopentyl itaconate, monocyclohexyl itaconate, and monocycloheptyl itaconate; itaconic acid monoalkylcycloalkyl esters such as monomethylcyclopentyl itaconate and monoethylcyclohexyl itaconate; etc. may be mentioned. Among these, maleic acid monoalkyl esters are preferable, maleic acid monoalkyl esters with an alkyl having 2 to 6 carbon atoms are more preferable, and mono n-butyl maleate is particularly preferable. The α,β-ethylenically unsaturated dicarboxylic acid monoester monomer may be used as single types alone or as a plurality of types together.

The content of the α,β-ethylenically unsaturated dicarboxylic acid monoester monomer units is 1 to 60 wt % with respect to the total monomer units, preferably 2 to 20 wt %, more preferably 2 to 10 wt %. If the content of the α,β-ethylenically unsaturated dicarboxylic acid monoester monomer units is too small, the obtained cross-linked rubber ends up becoming inferior in tensile strength. On the other hand, if too large, the compression set resistance and heat resistance are liable to deteriorate.

Further, the carboxyl group-containing highly saturated nitrile rubber (A1) used in the present invention preferably contains conjugated diene monomer units so that the obtained cross-linked rubber has rubber elasticity.

As the conjugated diene monomer forming the conjugated diene monomer units, conjugated diene monomers having 4 to 6 carbon atoms such as 1,3-butadiene, isoprene, 2,3-dimethyl-1,3-butadiene, 1,3-pentadiene, and chloroprene are preferable, 1,3-butadiene and isoprene are more preferable, and 1,3-butadiene is particularly preferable. The conjugated diene monomer may be used as single types alone or as a plurality of types together.

The content of the conjugated diene monomer units (including parts saturated by hydrogenation etc.) is preferably 25 to 84 wt % with respect to the total monomer units, more preferably 25 to 80 wt %, still more preferably 40 to 78 wt %. By making the content of the conjugated diene monomer units such a range, the obtained cross-linked rubber can be maintained excellent in heat resistance and chemical resistance stability while being made to have a sufficient rubber elasticity.

Further, the carboxyl group-containing highly saturated nitrile rubber (A1) used in present invention may be one obtained by copolymerizing a carboxyl group-containing monomer other than an α,β-ethylenically unsaturated dicarboxylic acid monoester monomer in a range not detracting from the effect of the present invention.

As such a carboxyl group-containing monomer, α,β-ethylenically unsaturated monocarboxylic acid monomers such as acrylic acid, methacrylic acid, ethylacrylic acid, and crotonic acid, cinnamic acid; butenedioic acids such as fumaric acid and maleic acid; itaconic acid, citraconic acid, mesaconic acid, glutaconic acid, allylmalonic acid, and teraconic acid may be mentioned. Further, as anhydrides of α,β-unsaturated polyvalent carboxylic acids, α,β-ethylenically unsaturated polyvalent carboxylic acid monomers such as maleic anhydride, itaconic anhydride, and citraconic anhydride; etc. may be mentioned.

The content of the units of the carboxyl group-containing monomer other than the α,β-ethylenically unsaturated dicarboxylic acid monoester monomer is preferably 20 wt % or less with respect to the total monomer units, more preferably 10 wt % or less, still more preferably 5 wt % or less.

Further, the carboxyl group-containing highly saturated nitrile rubber (A1) used in the present invention may be one which is obtained by copolymerizing, in addition to the α,β-ethylenically unsaturated nitrile monomer, α,β-ethylenically unsaturated dicarboxylic acid monoester monomer, conjugated diene monomer, and carboxyl group-containing monomer other than an α,β-ethylenically unsaturated dicarboxylic acid monoester monomer, another monomer able to be copolymerized with these. As such another monomer, ethylene, α-olefin monomer, aromatic vinyl monomer, α,β-ethylenically unsaturated carboxylic acid ester monomer (monomer not containing non-esterified nonsubstituted (free) carboxyl group), fluorine-containing vinyl monomer, copolymerizable antiaging agent, etc. may be illustrated.

As the α-olefin monomer, one having 3 to 12 carbon atoms is preferable. For example, propylene, 1-butene, 4-methyl-1-pentene, 1-hexene, 1-octene, etc. may be mentioned.

As the aromatic vinyl monomer, for example, styrene, α-methylstyrene, vinylpyridine, etc. may be mentioned.

As the α,β-ethylenically unsaturated carboxylic acid ester monomer, for example, (meth)acrylic acid esters (abbreviation for "methacrylate esters and acrylate esters", same below) having an alkyl group having 1 to 18 carbon atoms such as methyl acrylate, ethyl acrylate, n-butyl acrylate, n-dodecyl acrylate, methyl methacrylate, and ethyl methacrylate; (meth)acrylic acid esters having an alkoxyalkyl group having 2 to 12 carbon atoms such as methoxymethyl acrylate, methoxyethyl acrylate, and methoxyethyl methacrylate; (meth)acrylic acid esters having a cyanoalkyl group having 2 to 12 carbon atoms such as α-cyanoethyl acrylate, α-cyanoethyl methacrylate, and α-cyanobutyl methacrylate; (meth)acrylic acid esters having a hydroxyalkyl group having 1 to 12 carbon atoms such as 2-hydroxyethyl acrylate, 2-hydroxypropyl acrylate, and 2-hydroxyethyl methacrylate; (meth)acrylic acid esters having a fluoroalkyl group having 1 to 12 carbon atoms such as trifluoroethyl acrylate and tetrafluoropropyl methacrylate; α,β-ethylenically unsaturated dicarboxylic acid dialkyl esters such as dimethyl maleate, dimethyl fumarate, dimethyl itaconate, and diethyl itaconate; dialkylamino group-containing α,β-ethylenically unsaturated carboxylic acid esters such as dimethylaminomethyl acrylate and diethylaminoethyl acrylate; etc. may be mentioned.

As the fluorine-containing vinyl monomer, for example, fluoroethylvinyl ether, fluoropropylvinyl ether, o-trifluoromethylstyrene, vinyl pentafluorobenzoate, difluoroethylene, tetrafluoroethylene, etc. may be mentioned.

As the copolymerizable antiaging agent, for example, N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline, N-phenyl-4-(4-vinylbenzyloxy)aniline, etc. may be mentioned.

The copolymerizable other monomer may be used as a plurality of types together. The content of the units of the other monomer is preferably 50 wt % or less with respect to the total monomer units, more preferably 30 wt % or less, still more preferably 10 wt % or less.

The carboxyl group-containing highly saturated nitrile rubber (A1) used in the present invention has an iodine value of preferably 120 or less, more preferably 60 or less, still more preferably 40 or less, particularly preferably 30 or less. By making the iodine value 120 or less, the obtained cross-linked rubber can be improved in heat resistance.

The carboxyl group-containing highly saturated nitrile rubber (A1) has a polymer Mooney viscosity ($ML_{1-4}$, 100° C.) of preferably 10 to 200, more preferably 20 to 150, still more preferably 30 to 110. If the carboxyl group-containing highly saturated nitrile rubber (A1) becomes too low in polymer Mooney viscosity, the obtained cross-linked rubber is liable to fall in mechanical properties while conversely if it becomes too high, the processability of the rubber composition may fall.

Further, the content of the carboxyl group in the carboxyl group-containing highly saturated nitrile rubber (A1), that is, the number of moles of the carboxyl group per 100 g of the carboxyl group-containing highly saturated nitrile rubber (A1), is preferably 0.006 to 0.116 ephr, more preferably 0.012 to 0.087 ephr, particularly preferably 0.023 to 0.058 ephr. If the carboxyl group content of the carboxyl group-containing highly saturated nitrile rubber (A1) is too small, the obtained cross-linked rubber ends up becoming inferior in tensile strength under a high temperature. On the other hand, if too great, the congression set resistance and heat resistance may fall.

The method of production of the carboxyl group-containing highly saturated nitrile rubber (A1) used in the present invention is not particularly limited, but it is preferable to produce this by copolymerizing the above-mentioned monomers by emulsion polymerization using an emulsifier to prepare a latex of a copolymer rubber and hydrogenating it. At the time of emulsion polymerization, an ordinarily used polymerization secondary material such as an emulsifier, polymerization initiator, and molecular weight adjuster can be used.

The emulsifier is not particularly limited, but, for example, nonionic emulsifiers such as a polyoxyethylenealkyl ether, polyoxyethylenealkylphenol ether, polyoxyethylenealkyl ester, and polyoxyethylenesorbitanalkyl ester; anionic emulsifiers such as a salt of a fatty acid such as myristic acid, palmitic acid, oleic acid, and linoleic acid, alkylbenzene sulfonates such as sodium dodecylbenzene sulfonate, a higher alcohol sulfuric acid ester salt, and an alkylsulfosuccinic acid salt; copolymerizable emulsifiers such as a sulfo ester of an α,β-unsaturated carboxylic acid, a sulfate ester of an α,β-unsaturated carboxylic acid, and a sulfoalkylarylate ether; etc. may be mentioned. The amount of use of the emulsifier is preferably 0.1 to 10 parts by weight with respect to 100 parts by weight of the total monomers.

The polymerization initiator is not particularly limited so long as a radical initiator, but inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butyl peroxyisobutyrate; azo compounds such as azobisisobutyronitrile, azobis-2,4-dimethylvaleronitrile, azobis cyclohexanecarbonitrile, methylazobis isobutyrate; etc. may be mentioned. These polymerization initiators may be used alone or as two types or more combined. As the polymerization initiator, an inorganic or organic peroxide is preferable. When using a peroxide as a polymerization initiator, it is possible to combine it with a reducing agent such as sodium bisulfate and ferrous sulfate for use as a redox-type polymerization initiator. The amount of use of the polymerization initiator is preferably 0.01 to 2 parts by weight with respect to 100 parts by weight of the total monomers.

The molecular weight adjuster is not particularly limited, but mercaptans such as t-dodecyl mercaptan, n-dodecyl mercaptan, and octyl mercaptan; halogenated hydrocarbons such as carbon tetrachloride, methylene chloride, and methylene bromide; an a-methylstyrene dimer; sulfur-containing compounds such as tetraethylthiuram disulfide, dipentamethylenethiuram disulfide, and di isopropylxanthogen disulfide, etc. may be mentioned. These may be used alone or as two types or more combined. Among these, mercaptans are preferable, while t-dodecyl mercaptan is more preferable. The amount of use of the molecular weight adjuster is preferably 0.1 to 0.8 part by weight with respect to 100 parts by weight of the total monomers.

For the medium of emulsion polymerization, usually water is used. The amount of the water is preferably 80 to 500 parts by weight with respect to 100 parts by weight of the total monomers.

At the time of emulsion polymerization, furthermore, in accordance with need, a polymerization secondary material such as a stabilizer, dispersant, pH adjuster, deoxidant, and particle size adjuster can be used. When using these, the type and amount of use are not particularly limited.

Note that, when the iodine value of the copolymer obtained by copolymerization is higher than 120, to make the iodine value 120 or less, it is also possible to hydrogenate the copolymer (hydrogenation reaction). In this case, the method of hydrogenation is not particularly limited, but a known method may be employed.

Highly Saturated Nitrile Rubber (A2)

The highly saturated nitrile rubber (A2) used in the present invention is a rubber containing 15 to 60 wt % of α,β-ethylenically unsaturated nitrile monomer units, having a content of α,β-ethylenically unsaturated dicarboxylic acid monoester monomer units of 0.9 wt % or less, and having an iodine value of 120 or less. The highly saturated nitrile rubber (A2) used in the present invention is obtained by copolymerizing an α,β-ethylenically unsaturated nitrile monomer and a copolymerizable other monomer added in accordance with need.

As an α,β-ethylenically unsaturated nitrile monomer, ones similar to the above-mentioned carboxyl group-containing highly saturated nitrile rubber (A1) may be used. In the highly saturated nitrile rubber (A2), the content of the α,β-ethylenically unsaturated nitrile monomer units is 15 to 60 wt % with respect to the total monomer units, preferably 18 to 55 wt %, still more preferably 20 to 50 wt %. If the content of the α,β-ethylenically unsaturated nitrile monomer units is too small, the obtained cross-linked rubber is liable to fall in oil resistance and liquefied gas resistance while conversely if too large, may fall in cold resistance.

Further, in the highly saturated nitrile rubber (A2) used in the present invention, a conjugated diene monomer is preferably used as a monomer copolymerized with the α,β-ethylenically unsaturated nitrile monomer since the obtained cross-linked rubber has rubber elasticity. As the conjugated diene monomer, it is possible to use ones similar to the above-mentioned carboxyl group-containing highly saturated nitrile rubber (A1). In the highly saturated nitrile rubber (A2), the content of the conjugated diene monomer units (including also parts saturated by hydrogenation) is preferably 39.1 to 85 wt %, more preferably 44.5 to 82 wt %, still more preferably 50 to 80 wt % with respect to the total monomer units. If the content of the conjugated diene monomer units is too small, the obtained cross-linked rubber is liable to fall in rubber elasticity, while conversely if too great, the heat resistance and chemical resistance stability may be impaired.

Furthermore, the highly saturated nitrile rubber (A2) used in the present invention may be one obtained by copolymerizing an α,β-ethylenically unsaturated nitrile monomer and conjugated diene monomer together with another monomer able to copolymerize with these. As such other monomer, similar to the above-mentioned carboxyl group-containing highly saturated nitrile rubber (A1), ethylene, α-olefin monomer, aromatic vinyl monomer, α,β-ethylenically unsaturated carboxylic acid ester monomer (monomer not containing non-esterified nonsubstituted (free) carboxyl group), fluorine-containing vinyl monomer, copolymerizable antiaging agent, etc. may be illustrated.

Further, as the copolymerizable other monomer forming the highly saturated nitrile rubber (A2) used in the present invention, α,β-ethylenically unsaturated dicarboxylic acid monoester monomer may used, but the content of the α,β-ethylenically unsaturated dicarboxylic acid monoester monomer units is 0.9 wt % or less with respect to the total monomer units, preferably 0.5 wt % or less, while the content of the α,β-ethylenically unsaturated dicarboxylic acid monoester monomer units is particularly preferably 0 wt %. That is, it is particularly preferable that the α,β-ethylenically unsaturated dicarboxylic acid monoester monomer units substantially does not be contained. If the content of the α,β-ethylenically unsaturated dicarboxylic acid monoester monomer units is too great, compression set resistance and heat resistance are liable to deteriorate. Note that, as the α,β-ethylenically unsaturated dicarboxylic acid monoester monomer, ones similar to the above-mentioned carboxyl group-containing highly saturated nitrile rubber (A1) may be mentioned.

Further, the highly saturated nitrile rubber (A2) used in the present invention may be one obtained by copolymerizing a carboxyl group-containing monomer other than the α,β-ethylenically unsaturated dicarboxylic acid monoester monomer in a range not detracting from the effect of the present invention. However, the content of the carboxyl group-containing monomer units other than the α,β-ethylenically unsaturated dicarboxylic acid monoester monomer is preferably 5 wt % or less with respect to the total monomer units, more preferably 3 wt % or less, while a content of the carboxyl group-containing monomer units of 0 wt % is particularly preferable. That is, it is particularly preferable that the carboxyl group-containing monomer units other than the α,β-ethylenically unsaturated dicarboxylic acid monoester monomer units substantially does not be contained. If the content of the carboxyl group-containing monomer units is too great, compression set resistance, heat resistance, and cold resistance are liable to deteriorate. Further, as the carboxyl group-containing monomer other than the α,β-ethylenically unsaturated dicarboxylic acid monoester monomer, ones similar to the above-mentioned carboxyl group-containing highly saturated nitrile rubber (A1) may be mentioned.

The highly saturated nitrile rubber (A2) used in the present invention has an iodine value of preferably 120 or less, more preferably 60 or less, still more preferably 40 or less, particularly preferably 30 or less. By making the iodine value 120 or less, it is possible to improve the obtained cross-linked rubber in heat resistance.

The highly saturated nitrile rubber (A2) has a polymer Mooney viscosity ($ML_{1+4}$, 100° C.) of preferably 10 to 200, more preferably 20 to 150, still more preferably 30 to 110. If the highly saturated nitrile rubber (A2) is too low in polymer Mooney viscosity, the obtained cross-linked rubber is liable to fall in mechanical properties, while conversely if too high, the processability as the rubber composition can fall.

Further, the content of the carboxyl group in the highly saturated nitrile rubber (A2), that is, the number of moles of the carboxyl group per 100 g of the highly saturated nitrile rubber (A2) is preferably 0.005 ephr or less, more preferably 0.003 ephr or less, while 0 ephr is particularly preferable. That is, the carboxyl group substantially not being contained is particularly preferable. If the highly saturated nitrile rubber (A2) is too great in carboxyl group content, compression set resistance and heat resistance may deteriorate.

In the highly saturated nitrile rubber composition used in the present invention, the ratios of content of the carboxyl group-containing highly saturated nitrile rubber (A1) and highly saturated nitrile rubber (A2) are, by weight ratio of "carboxyl group-containing highly saturated nitrile rubber (A1):highly saturated nitrile rubber (A2)", 5:95 to 95:5 in range, preferably 5:95 to 50:50 in range, more preferably 5:95 to 40:60 in range. If the ratio of content of the carboxyl group-containing highly saturated nitrile rubber (A1) is too small, the processability as a rubber composition deteriorates and the obtained cross-linked rubber ends up falling in tensile strength, liquefied gas resistance, compression set resistance, and refrigerating machine oil resistance. On the other hand, if the ratio of content of the carboxyl group-containing highly saturated nitrile rubber (A1) is too great, the obtained cross-linked rubber ends up falling in compression set resistance and heat resistance.

Note that, if the highly saturated nitrile rubber (A2) is not used at all, the obtained cross-linked rubber deteriorates considerably in tensile strength and congression set resistance.

The method of production of the highly saturated nitrile rubber (A2) used in the present invention is not particularly limited, but may be made the same as the above-mentioned carboxyl group-containing highly saturated nitrile rubber (A1).

Polyamide Resin (B)

The highly saturated nitrile rubber composition used in the present invention contains a polyamide resin (B) with a melting point of 150° C. or more in addition to the above-mentioned carboxyl group-containing highly saturated nitrile rubber (A1) and highly saturated nitrile rubber (A2).

In the present invention, as the highly saturated nitrile rubber, a carboxyl group-containing highly saturated nitrile rubber (A1) with a content of α,β-ethylenically unsaturated dicarboxylic acid monoester monomer units in a predetermined range and a highly saturated nitrile rubber (A2) with a content of α,β-ethylenically unsaturated dicarboxylic acid monoester monomer units of a predetermined amount or less, that is, two types of rubber, are jointly used. To this, the polyamide resin (B) with a melting point of 150° C. or more is added. Further, to this, by adding the later explained cross-linking agent (C) and by controlling the storage elastic modulus E' at 150° C. of the cross-linked rubber obtained by cross-linking to 5 MPa or more, the liquefied gas resistance and refrigerating machine oil resistance can be improved. That is, it is possible to improve the liquefied gas resistance, compression set resistance, and refrigerating machine oil resistance while being good in the mechanical strength.

The polyamide resin (B) used in the present invention is not limited so long as a polymer having a melting point of 150° C. or more and having acid amide bonds (—CONH—). For example, a polymer obtained by polycondensation of a diamine and dibasic acid, a polymer obtained by polycondensation of a diamine derivative such as diformyl and a dibasic acid, a polymer obtained by polycondensation of a dibasic acid derivative such as a dimethyl ester and a diamine, a polymer obtained by reaction of dinitrile or diamide and formaldehyde, a polymer obtained by polyadcondition of diisocyanate and dibasic acid, a polymer obtained by self-condensation of an amino acid or its derivative, a polymer obtained by ring-opening polymerization of lactam, etc. may be mentioned. Further, these polyamide resins may also contain a polyether block.

As specific examples of the polyamide resin (B), an aliphatic polyamide resin such as Nylon 46, Nylon 6, Nylon 66, Nylon 610, Nylon 612, Nylon 1010, Nylon 1012, Nylon 11, and Nylon 12; an aromatic polyamide resin such as polyhexamethylenediamine terephthalamide, polyhexamethylene isophthamide, and an xylene-containing polyamide; etc. may be mentioned. Among these, since the effect of the present invention becomes more remarkable, an aliphatic polyamide resin is preferable, Nylon 6, Nylon 66, Nylon 610, Nylon 612, Nylon 1010, and Nylon 1012 are more preferable, Nylon 6, Nylon 66, Nylon 1010, and Nylon 1012 are further preferable, and Nylon 66 and Nylon 1012 are particularly preferable.

Further, the polyamide resin (B) used in the present invention has a melting point of 150° C. or more, preferably 150 to 350° C., more preferably 170 to 330° C., still more preferably 200 to 300° C. If the melting point is too low, the obtained cross-linked rubber is liable to fall in heat resistance and liquefied gas resistance.

In the highly saturated nitrile rubber composition used in the present invention, the ratio of content of the polyamide resin (B) with respect to the total of the carboxyl group-containing highly saturated nitrile rubber (A1) and highly saturated nitrile rubber (A2) (below, "total amount of nitrile rubber"), that is, the weight ratio of the "total amount of nitrile rubber:amount of polyamide resin (B)", is preferably 95:5 to 50:50 in range, more preferably 90:10 to 60:40 in range. If the total amount of the nitrile rubber is too great, compression set resistance and the liquefied gas resistance are liable to fall. On the other hand, if the content of the polyamide resin (B) is too great, the obtained cross-linked rubber is liable to become too high in hardness.

Cross-Linking Agent (C)

The highly saturated nitrile rubber composition used in the present invention contains a cross-linking agent (C) in addition to the above-mentioned carboxyl group-containing highly saturated nitrile rubber (A1), highly saturated nitrile rubber (A2), and polyamide resin (B). The cross-linking agent (C) may be one able to cross-link the carboxyl group-containing highly saturated nitrile rubber (A1) and highly saturated nitrile rubber (A2). A sulfur cross-linking agent, organoperoxide cross-linking agent, polyamine cross-linking agent, etc. may be mentioned. Among these, from the viewpoint of the obtained cross-linked rubber becoming excellent in original state physical properties and heat resistance, an organoperoxide cross-linking agent is preferable.

As the organoperoxide cross-linking agent, a conventional known one may be used. Dicumyl peroxide, cumen hydroperoxide, t-butylcumyl peroxide, p-menthane hydroperoxide, di-t-butylperoxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butylperoxy)-n-butyl valerate, 2,5-dimethyl-2,5-di-t-butylperoxyhexane, 2,5-dimethyl-2,5-di-t-butylperoxyhexine-3,1,1-di-t-butylperoxy-3,5,5-trimethylcyclohexane, p-chlorobenzoyl peroxide, t-butylperoxyisopropyl carbonate, t-butylperoxy benzoate, etc. may be mentioned. Among these, 1,3-bis(t-butylperoxyisopropyl)benzene is preferable. These may be used as single types alone or as a plurality of types combined.

In the highly saturated nitrile rubber composition used in the present invention, the amount of the cross-linking agent (C) is preferably 0.1 to 30 parts by weight with respect to 100 parts by weight of the total of the carboxyl group-containing highly saturated nitrile rubber (A1) and highly saturated nitrile rubber (A2), more preferably 1 to 20 parts by weight, still more preferably 2 to 10 parts by weight. If the amount of the cross-linking agent (C) is too small, the obtained cross-linked rubber is liable to fall in mechanical properties. On the other hand, if too great, the obtained cross-linked rubber may deteriorate in fatigue resistance.

Further, the highly saturated nitrile rubber composition used in the present invention may further contain a co-cross-linking agent. As the co-cross-linking agent, a low molecular weight or high molecular weight compound having a plurality of radical reactive unsaturated groups in its molecule is preferable. For example, polyfunctional vinyl compounds such as divinylbenzene and divinylnaphthalate; isocyanurates such as triallyl isocyanurate and trimethallyl isocyanurate; cyanurates such as triallyl cyanurate; maleimides such as N,N'-m-phenylene dimaleimide; allyl esters of a polyvalent acid such as diallyl phthalate, diallyl isophthalate, diallyl maleate, diallyl fumarate, diallyl sebacate, and triallyl phosphate; diethyleneglycol bisallyl carbonate; allyl ethers such as ethyleneglycol diallylether, triallyl ether of trimethylol propane, and partial allyl ether of pentaerythritol; allyl-modified resins such as allylated novolac resin and allylated resole resin; tri- to penta-functional methacrylate compounds or acrylate compounds such as trimethylolpropane trimethacrylate and trimethylolpropane triacrylate; etc. may be mentioned. Among these, from the viewpoint that the effect of the present invention becomes much more remarkable, isocyanurates are preferable, while triallyl isocyanurate is particularly preferable.

In the highly saturated nitrile rubber composition used in the present invention, the amount when including a co-cross-linking agent is preferably 0.5 to 20 parts by weight with respect to 100 parts by weight of the total of the carboxyl group-containing highly saturated nitrile rubber (A1), highly saturated nitrile rubber (A2), and polyamide resin (B), more preferably 1 to 15 parts by weight, still more preferably 1.5 to 10 parts by weight.

Other Compounding Agents

Further, the highly saturated nitrile rubber composition used in the present invention preferably contains a filler in addition to the above ingredients. The filler may be any filler which is generally used as a compounding agent for rubber processing. Either of a reinforcing filler or nonreinforcing filler may be used and it is not particularly limited, but carbon black, silica, calcium carbonate, magnesium carbonate, talc, clay, metal oxides such as zinc oxide, graphite, diatomaceous earth, bituminous powder, mica, etc. may be mentioned, but carbon black, silica, or calcium carbonate is preferable, while carbon black is particularly preferable.

As the carbon black, for example, furnace black, acetylene black, thermal black, channel black, etc. may be mentioned.

Further, as the filler, one having an average particle size of 0.01 to 50 µm is preferable, one of 0.02 to 10 µm is more preferable, and one of 0.03 to 5 um is particularly preferable. By using a filler having an average particle size in the above ranges, the obtained cross-linked rubber can be be made more excellent in liquefied gas resistance, compression set resistance, and refrigerating machine oil resistance while keeping the hardness low.

When using a filler comprised of carbon black, one of an average particle size of 0.01 to 5 µm is preferable, one of 0.02 to 2.5 µm is more preferable, and one of 0.03 to 1 pm is particularly preferable. Further, the size and surface properties of the aggregates of the particles are not limited.

Note that, the fillers can be used as single types alone or as two types or more combined. By mixing in a filler, the obtained cross-linked rubber can be improved in liquefied gas resistance and refrigerating machine oil resistance.

In the highly saturated nitrile rubber composition used in the present invention, the amount of the filler is preferably 2 to 200 parts by weight with respect to 100 parts by weight of the total of the carboxyl group-containing highly saturated nitrile rubber (A1), highly saturated nitrile rubber (A2), and polyamide resin (B), more preferably 5 to 180 parts by weight, still more preferably 10 to 150 parts by weight. By making the amount of the filler the above range, the obtained cross-linked rubber can be made more excellent in liquefied gas resistance, compression set resistance, and refrigerating machine oil resistance while keeping the hardness low.

Further, the highly saturated nitrile rubber composition used in the present invention may contain, in addition to the above-mentioned ingredients, a compounding agent usually used in the field of rubber processing, for example, a cross-linking accelerator, cross-linking aid, cross-linking retarder, antiaging agent, antioxidant, photostabilizer, silane coupling agent, scorch preventer, plasticizer, processing aid, slip agent, tackifier, lubricant, flame retardant, antifungal agent, acid acceptor, antistatic agent, pigment, unsaturated carboxylic acid metal salt, etc. The amounts of the compounding agents are not particularly limited so long as in the range not obstructing the effect of the present invention. Amounts commensurate with the objective may be mixed in.

Furthermore, the highly saturated nitrile rubber composition used in the present invention may contain a rubber other than the above-mentioned carboxyl group-containing highly saturated nitrile rubber (A1) and highly saturated nitrile rubber (A2) in a range not detracting from the effect of the present invention.

As such rubber, acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluororubber, natural rubber, polyisoprene rubber, etc. may be mentioned.

When adding rubber other than the carboxyl group-containing highly saturated nitrile rubber (A1) and highly saturated nitrile rubber (A2), the amount in the highly saturated nitrile rubber composition is preferably 30 parts by weight or less with respect to 100 parts by weight of the total of the carboxyl group-containing highly saturated nitrile rubber (A1) and highly saturated nitrile rubber (A2), more preferably 20 parts by weight or less, still more preferably 10 parts by weight or less.

The highly saturated nitrile rubber composition used in the present invention is, for example, produced by kneading the above-mentioned carboxyl group-containing highly saturated nitrile rubber (A1), highly saturated nitrile rubber (A2), and polyamide resin (B) at preferably a temperature of 180° C. or more by primary kneading, cooling the obtained the kneaded material to preferably 5 to 150° C., and adding a cross-linking agent (C) and various compounding agents used according to need etc. and secondary kneading it.

The method of kneading in the primary kneading is not particularly limited, but the method of mixing by a kneading machine such as an extruder such as a single-screw extruder and twin-screw extruder; a sealed type mixer such as a kneader, Banbury mixer, Brabender mixer and internal mixer; and a roll kneader; may be mentioned. Among these, in particular, due to the high production efficiency and dispersion efficiency, the method of kneading by a twin-screw kneader is preferable.

Further, when kneading the carboxyl group-containing highly saturated nitrile rubber (A1), highly saturated nitrile rubber (A2), and polyamide resin (B), the kneading temperature is preferably 180° C. or more, more preferably 200° C. or more, still more preferably 220° C. or more. Further, the upper limit of the kneading temperature is preferably 400° C. or less, particularly preferably 350° C. or less. By making the kneading temperature the above range, the molten state polyamide resin (B), carboxyl group-containing highly saturated nitrile rubber (A1), and highly saturated nitrile rubber (A2) can be mixed to a better state. Further, due to this, the effect of the present invention becomes much more remarkable. Note that, when kneading the carboxyl group-containing highly saturated nitrile rubber (A1), highly saturated nitrile rubber (A2), and polyamide resin (B), the various types of compounding agents excluding the cross-linking agent (C) and ingredients unstable against heat, and the other rubber can be simultaneously mixed.

Cross-Linked Rubber for Liquefied Gas Seal

The cross-linked rubber for a liquefied gas seal of the present invention (below, suitably abbreviated as "cross-linked rubber") is a cross-linked rubber which is obtained by cross-linking the above-mentioned highly saturated nitrile rubber composition and is used for a liquefied gas seal.

The cross-linked rubber of the present invention has a storage elastic modulus E' at 150° C. of 5 MPa or more, preferably 6 MPa or more, more preferably 7 MPa or more. Note that, the upper limit of the storage elastic modulus E' at 150° C. is not particularly limited, but is usually 100 MPa or less. In the present invention, by using the above-mentioned highly saturated nitrile rubber composition and making the storage elastic modulus E' at 150° C. 5 MPa or more, the liquefied gas resistance and refrigerating machine oil resistance can be improved. Note that, the storage elastic modulus E' at 150° C. is an indicator showing the elastic component for holding the stress built up inside of the cross-linked rubber. For example, it is possible to use a dynamic viscoelasticity measuring device to measure sheet-shaped cross-linked rubber obtained by using the highly saturated nitrile rubber composition in a 150° C. atmosphere in a tensile mode. If the storage elastic modulus E' is less than 5 MPa, rubber ends up becoming inferior in the liquefied gas resistance and refrigerating machine oil resistance.

The cross-linked rubber of the present invention can be produced by using the above-mentioned highly saturated nitrile rubber composition, shaping it by a molding machine corresponding to the desired shape, for example, extruder, injection molding machine, press, rolls, etc., and heating it to thereby cause a cross-linking reaction and fix the shape as a cross-linked product. In this case, the rubber may be cross-linked after shaping it in advance or may be cross-linked simultaneously with shaping. As the heating method, a general method used for cross-linking of rubber such as press heating, steam heating, oven heating, and hot air heating may be suitably selected.

Note that, in the present invention, the method of making the storage elastic modulus E' at 150° C. of the cross-linked rubber 5 MPa or more is not particularly limited, but the storage elastic modulus can be controlled by adjusting the ratio of contents of the carboxyl group-containing highly saturated nitrile rubber (A1) and the highly saturated nitrile rubber (A2) in the highly saturated nitrile rubber composition, the ratio of content of the polyamide resin (B), the type and melting point of the polyamide resin (B), the type and amount of the plasticizer contained in the highly saturated nitrile rubber composition, the type and amount of the filler contained in the highly saturated nitrile rubber composition, the average particle size of the filler, the type and amount of the cross-linking agent (C), the type and amount of the co-cross-linking agent, and, furthermore, the kneading temperature of the carboxyl group-containing highly saturated nitrile rubber (A1), highly saturated nitrile rubber (A2), and polyamide resin (B) when preparing the above-mentioned highly saturated nitrile rubber composition, the cross-linking conditions when cross-linking the above-mentioned highly saturated nitrile rubber composition (cross-linking time, cross-linking temperature, etc.), etc.

For example, from the viewpoint of making the storage elastic modulus E' at 150° C. of the cross-linked rubber 5 MPa or more, the amount of the plasticizer in the highly saturated nitrile rubber composition is preferably 25 parts by weight or less with respect to 100 parts by weight of the total of the carboxyl group-containing highly saturated nitrile rubber (A1), highly saturated nitrile rubber (A2), and polyamide resin (B), more preferably 20 parts by weight or less, still more preferably no plasticizer is substantially contained.

Further, when using carbon black with an average particle size of 0.01 to 5 μm as the filler contained in the highly saturated nitrile rubber composition, the amount of the filler in the highly saturated nitrile rubber composition depends on the type and amount of the plasticizer used, the cross-linking conditions, etc. as well, but from the viewpoint of making the storage elastic modulus E' at 150° C. of the cross-linked rubber 5 MPa or more, it is preferable to suitably adjust the amount to preferably 2 to 200 parts by weight with respect to 100 parts by weight of the total of the carboxyl group-containing highly saturated nitrile rubber (A1), highly saturated nitrile rubber (A2), and polyamide resin (B), more preferably 5 to 180 parts by weight, still more preferably 10 to 150 parts by weight in range.

Furthermore, the kneading temperature of the above-mentioned carboxyl group-containing highly saturated nitrile rubber (A1), highly saturated nitrile rubber (A2), and polyimide resin (B) is preferably made 180° C. or more as mentioned above, more preferably 200° C. or more, still more preferably 220° C. or more. Further, the upper limit of the kneading temperature is preferably 400° C. or less, particularly preferably 350° C. or less.

Further, the cross-linking conditions when cross-linking the above-mentioned highly saturated nitrile rubber composition depend also on the type, the average particle size and the amount of the filler (c) which is used and type or amount of the plasticizer which is used etc., but from the viewpoint of making the storage elastic modulus E' at 150° C. of the cross-linked rubber 5 MPa or more, the cross-linking temperature is preferably 110 to 200° C., more preferably 120 to 190° C., while the cross-linking time is preferably 1 minute to 24 hours, more preferably 1.5 minutes to 1 hour. Further, when further secondary cross-linking is required due to the shape, size, etc. of the cross-linked rubber, the cross-linking temperature of the secondary cross-linking is preferably 110 to 200° C., more preferably 120 to 190° C., while the cross-linking time of the secondary cross-linking is preferably 10 minutes to 24 hours, more preferably 30 minutes to 8 hours.

In the present invention, by suitably combining these conditions, it is possible to make the storage elastic modulus E' at 150° C. of the cross-linked rubber 5 MPa or more, preferably 6 MPa or more, more preferably 7 MPa or more.

The thus obtained cross-linked rubber of the present invention is excellent in mechanical strength, liquefied gas resistance, compression set resistance, and refrigerating machine oil resistance and is used for applications as seal members of liquefied gas, specifically as seal members for contact with liquefied gas. As the liquefied gas, one of a pressure at a temperature for ordinary use (for example, 25° C.) of 0.2 MPa or more and a boiling point of 0° C. or less may be suitably mentioned. The cross-linked rubber of the present invention is suitable as a seal member for contact with liquefied gas such as a fluorohydrocarbon or carbon dioxide used for a cooling device of an air-conditioner or a compressor of an air-conditioning system etc. even among seal members for liquefied gas.

Note that, as the fluorohydrocarbon, 1,1,1,2-tetrafluoroethane (HFC-134a), 1,1,1-trifluoroethane (HFC-143a), 1,1-difluoroethane (HFC-152a), pentafluoroethane (HFC-125), difluoromethane (HFC-32), trifluoromethane (HFC-23), 2,3,3,3-tetrafluoro-1-propene (HFO-234yf), and mixtures of these etc. may be mentioned. As the liquefied gas used for a compressor etc., in addition to a fluorohydrocarbon and carbon dioxide, isobutene, propane, dimethylether, or another hydrocarbon, ammonia, etc. may be mentioned.

In particular, the cross-linked rubber of the present invention is not only excellent in liquefied gas resistance and refrigerating machine oil resistance, but also excellent in mechanical strength and compression set resistance, so even when used for applications for holding high pressure and further repeating pressure increase and pressure decreases such as applications for seal members for refrigerating machines, an excellent sealability can be exhibited.

EXAMPLES

Below, examples and comparative examples will be given to explain the present invention more specifically, but the present invention is not limited to these examples. Below, unless particularly indicated, "parts" are based on weight. The methods for testing and evaluating the physical properties and characteristics are as follows:

Iodine Value

The iodine value of the highly saturated nitrile rubber was measured based on JIS K6235.

Carboxyl Group Content

To 0.2 g of 2 mm square pieces of highly saturated nitrile rubber, 100 ml of 2-butanone was added and stirred for 16 hours, then 20 ml of ethanol and 10 ml of water were added. While stirring, a 0.02N hydrous ethanol solution of potassium hydroxide was used for titration at room temperature using Thymolphthalein as an indicator to thereby find the number of moles of carboxyl groups with respect to 100 g of highly saturated nitrile rubber (units: ephr).

Ratio of Content of Monomer Units Forming Highly Saturated Nitrile Rubber

The ratio of content of mono n-butyl maleate units was found as follows. To 0.2 g of 2 mm square pieces of highly saturated nitrile rubber, 100 ml of 2-butanone was added and stirred for 16 hours, then 20 ml of ethanol and 10 ml of water were added. While stirring, a 0.02N hydrous ethanol solution of potassium hydroxide was used for titration at room temperature using Thymolphthalein as an indicator to thereby find the number of moles of carboxyl groups with respect to 100 g of highly saturated nitrile rubber. The number of moles found were converted to amount of mono n-butyl maleate units to find the content.

The ratios of contents of 1,3-butadiene units and saturated butadiene units were calculated by using highly saturated nitrile rubber to measure the iodine values before hydrogenation and after hydrogenation (according to JIS K6235).

The ratio of content of acrylonitrile units was calculated by measuring the nitrogen content in the highly saturated nitrile rubber according to JIS K6384 by the Kjeldahl method.

Mooney Viscosity (Polymer Mooney and Compound Mooney)

The Mooney viscosity of the highly saturated nitrile rubber (polymer Mooney) and Mooney viscosity of the highly saturated nitrile rubber composition (compound Mooney) was measured in accordance with JIS K6300-1 (units: ($ML_{1+4}$, 100° C.)).

Storage Elastic Modulus E'

Sheet shaped cross-linked rubber was punched into a piece of a width 10 mm, length 50 mm in the machine direction to obtain a piece of cross-linked rubber for a dynamic viscoelasticity test. Further, the obtained piece of the cross-linked rubber for the dynamic viscoelasticity test was measured for storage elastic modulus E' using a dynamic viscoelasticity measurement device (product name "Explexor 500N", made by GABO QUALIMETER Testanlagen GmbH) under conditions of a measurement frequency: 10 Hz, static strain: 1.0%, dynamic strain: 0.2%, temperature: 150° C., chuck distance: 30 mm, measurement mode: tensile mode.

Original State Physical Properties (Tensile Strength, Elongation, 50% Tensile Stress, 100% Tensile Stress, Hardness)

Sheet shaped cross-linked rubber was punched in the machine direction by a No. 3 dumbbell shaped die to prepare a test piece. Further, the obtained test piece was used in accordance with JIS K6251 to measure the tensile strength, elongation, 50% tensile stress, and 100% tensile stress. Further, in accordance with JIS K6253, a Durometer hardness tester (type A) was used to measure the hardness right after bringing the pressure plate into contact with the test piece.

Liquefied Gas Resistance

Sheet shaped cross-linked rubber was punched into a piece of vertical 2 cm and horizontal 3 cm shape to prepare a test piece. This test piece and 1,1,1,2-tetrafluoroethane were placed into a pressure resistant container. In that state (state where test piece was immersed in solution of 1,1,1,2-tetrafluoroethane), the test piece was allowed to stand at 23° C. for 24 hours. After standing for 24 hours, the 1,1,1,2-tetrafluoroethane was discharged from the pressure resistant container into the atmosphere. The test piece was quickly taken out and placed into a warming device adjusted in advance to 150° C., then the test piece was heated for 1 hour. At this time, the state of the bubbles famed at the surface of the vulcanized rubber due to rapid vaporization of the 1,1,1,2-tetrafluoroethane which had been impregnated in the test piece was observed to evaluate the liquefied gas resistance (fluorohydrocarbon resistance). In the present examples, the front and back of the test piece were observed. The number of bubbles at the surface with the greater number of bubbles were counted and evaluated by the following criteria. The smaller the number of bubbles, the better the liquefied gas resistance (fluorohydrocarbon resistance) that can be judged.

1: 0 number of bubbles
2: 1 to 15 number of bubbles
3: 16 or more number of bubbles Compression Set Test (O-Ring Compression Set)

Using O-ring shaped cross-linked rubber, the compression set (O-ring compression set) was measured in accordance with JIS K6262 in the state with the distance between the two flat surfaces sandwiching the O-ring shaped cross-linked rubber compressed 25% in the ring thickness direction and under conditions of 150° C. for 70 hours. The smaller the value, the better the compression set resistance.

Refrigerating Machine Oil Resistance

Using sheet shaped cross-linked rubber, in accordance with JIS K6258, the cross-linked rubber was immersed in refrigerating machine oil (PAG oil, product name "SUNICE P-56", made by Japan Sun Oil) under conditions of a temperature of 150° C. for 70 hours. Further, the volumes of the cross-linked rubber before and after immersion were measured and the volume change rate $\Delta V$ (units: %) after immersion was calculated in accordance with "volume change rate $\Delta V$=([volume after immersion-volume before immersion]/volume before immersion)×100" to evaluate the refrigerating machine oil resistance. The closer the absolute value of the value of the volume change rate $\Delta V$ to 0, the smaller the change in dimensions due to the refrigerating machine oil and the better the refrigerating machine oil resistance can be judged.

Synthesis Example 1

Synthesis of Carboxyl Group-Containing Highly Saturated Nitrile Rubber (A1-1)

To a reactor, 180 parts of ion exchanged water, 25 parts of a concentration 10 wt % sodium dodecylbenzene sulfonate aqueous solution, 37 parts of acrylonitrile, 6 parts of mono n-butyl maleate, and 0.5 part of t-dodecyl mercaptan (molecular weight adjuster) were charged in that order. The inside gas was replaced with nitrogen 3 times, then 57 parts of 1,3-butadiene were charged. The reactor was held at 5° C., 0.1 part of cumen hydroperoxide (polymerization initiator) was charged and the polymerization reaction was performed for 16 hours while stirring. Next, 0.1 part of a concentration 10 wt % hydroquinone (polymerization terminator) aqueous solution was added to stop the polymerization reaction, then a rotary evaporator of a water temperature 60° C. was used to remove the residual monomer to obtain a latex of carboxyl group-containing nitrile rubber (solid content concentration of about 30 wt %).

Next, to give an amount of palladium of 1,000 ppm by weight with respect to the dry weight of the rubber contained in the obtained latex, an autoclave was charged with a latex and palladium catalyst (solution of 1 wt % palladium acetate acetone solution and equal amount of ion exchanged water mixed together). The result was hydrogenated by reaction by a hydrogen pressure of 3 MPa and temperature of 50° C. for 6 hours to obtain a latex of carboxyl group-containing highly saturated nitrile rubber (A1-1).

Further, to the obtained latex, two times the volume of methanol was added to cause it to coagulate, then the result was filtered to obtain crumbs. These were dried in vacuo at 60° C. for 12 hours to thereby obtain carboxyl group-containing highly saturated nitrile rubber (A1-1). The obtained carboxyl group-containing highly saturated nitrile rubber (A1-1) was comprised of 35.6 wt % of acrylonitrile units, 59.0 wt % of butadiene units (including saturated parts), and 5.4 wt % of mono n-butyl maleate units, had an iodine value of 7, had a carboxyl group content of $3.1 \times 10^{-2}$ ephr, and had a polymer Mooney viscosity ($ML_{1+4}$, 100° C.) of 55.

Synthesis Example 2

Synthesis of Highly Saturated Nitrile Rubber (A2-1)

In a reactor, to 200 parts of ion exchanged water, 0.2 part of sodium carbonate was dissolved. To this, 2.25 parts of fatty acid potassium soap (potassium salt of fatty acid) was added to prepare a soap water solution. Further, to this soap water solution, 42 parts of acrylonitrile and 0.47 part of t-dodecylmercaptan (molecular weight adjuster) were charged in that order. The inside gas was replaced with nitrogen 3 times, then 58 parts of 1,3-butadiene were charged. Next, the inside of the reactor was held at 5° C., 0.1 part of cumen hydroperoxide (polymerization initiator) and suitable amounts of the reducing agent and chelating agent were charged and the polymerization reaction was performed for 16 hours while holding the temperature at 5° C. Next, 0.1 part of a concentration 10% hydroquinone (polymerization terminator) aqueous solution was added to stop the polymerization reaction and a rotary evaporator of a water temperature 60° C. was used to remove the residual monomer to obtain a latex of nitrile rubber (solid content concentration of about 25 wt %).

Next, the above obtained latex was added to an amount of an aqueous solution of aluminum sulfate of 3 wt % with respect to the amount of nitrile rubber and stirred to coagulate the latex. This was washed by water while separating it by filtration, then was dried in vacuo at 60° C. for 12 hours to obtain nitrile rubber. Further, the obtained nitrile rubber was dissolved in acetone to a concentration of 12%. This was placed in an autoclave, then 500 ppm by weight of a palladium-silica catalyst was added to the nitrile rubber and the result was hydrogenated by reaction by a hydrogen pressure of 3.0 MPa. After the end of the hydrogenation reaction, the result was poured into a large amount of water to cause it to coagulate and was separated by filtration and dried to obtain a highly saturated nitrile rubber (A2-1). The obtained highly saturated nitrile rubber (A2-1) was comprised of 40.5 wt % of acrylonitrile units and 59.5 wt % of butadiene units (including saturated parts), had an iodine value of 7, and had a polymer Mooney viscosity ($ML_{1+4}$, 100° C.) of 87. Further, the highly saturated nitrile rubber (A2-1) was measured for carboxyl group content in accordance with the above method, whereupon it was the detection limit or less. No carboxyl group was substantially contained.

Synthesis Example 3

Synthesis of Highly Saturated Nitrile Rubber (A2-2)

In a reactor, to 200 parts of ion exchanged water, 0.2 part of sodium carbonate was dissolved. To this, 2.25 parts of fatty acid potassium soap (potassium salt of fatty acid) was added to prepare a soap water solution. Further, to this soap water solution, 38 parts of acrylonitrile and 0.50 parts of t-dodecylmercaptan (molecular weight adjuster) were charged in that order. The inside gas was replaced with nitrogen 3 times, then 62 parts of 1,3-butadiene were charged. Next, the inside of the reactor was held at 5° C., 0.1 part of rumen hydroperoxide (polymerization initiator) and suitable amounts of the reducing agent and chelating agent were charged and the polymerization reaction was pertained for 16 hours while holding the temperature at 5° C. Next, 0.1 part of a concentration 10% hydroquinone (polymerization terminator) aqueous solution was added to stop the polymerization reaction and a rotary evaporator of a water temperature 60° C. was used to remove the residual monomer to obtain a latex of nitrile rubber (solid content concentration of about 25 wt %).

Next, the above obtained latex was added to an amount of an aqueous solution of aluminum sulfate of 3 wt % with respect to the amount of nitrile rubber and stirred to coagulate the latex. This was washed by water while separating it by filtration, then was dried in vacuo at 60° C. for 12 hours to obtain nitrile rubber. Further, the obtained nitrile rubber was dissolved in acetone to a concentration of 12%. This was placed in an autoclave, then 400 ppm by weight of a palladium-silica catalyst was added to the nitrile rubber and the result was hydrogenated by reaction by a hydrogen pressure of 3.0 MPa. After the end of the hydrogenation reaction, the result was poured into a large amount of water to cause it to coagulate and was separated by filtration and dried to obtain a highly saturated nitrile rubber (A2-2). The obtained highly saturated nitrile rubber (A2-2) was comprised of 36.1 wt % of acrylonitrile units and 53.9 wt % of butadiene units (including saturated parts), had an iodine value of 10, and had a polymer Mooney viscosity ($ML_{1+4}$, 100° C.) of 80. Further, the highly saturated nitrile rubber (A2-2) was measured for carboxyl group content in accordance with the above method, whereupon it was the detection limit or less. No carboxyl group was substantially contained.

Example 1

20 parts of the carboxyl group-containing highly saturated nitrile rubber (A1-1) obtained in Synthesis Example 1, 50 parts of the highly saturated nitrile rubber (A2-1) obtained in Synthesis Example 2, and 30 parts of Nylon 66 (product name "Amilan CM3006", made by Toray, melting point 265° C.) were kneaded using a twin-screw kneader at 280° C. to obtain a kneaded material.

Then, using a Banbury mixer, to 100 parts of the kneaded material obtained above, 20 parts of N990 carbon (product name "Thermax MT", made by Cancarb, carbon black, average particle size 0.28 μm) and 1.5 parts of 4,4'-di-(α, α-dimethylbenzyl)diphenylamine (product name "Nocrac CD", made by Ouchi Shinko Chemical Industrial, antiaging agent) were added and kneaded. Next, the kneaded material was transferred to rolls, and 8 parts of 1,3-bis(t-butylperoxyisopropyl)benzene 40% product (product name "Vul Cup 40KE", made by Arkema, organoperoxide cross-linking agent) and 4 parts of triallyl isocyanurate (product name "TALC", made by Nippon Kasei Chemical, co-cross-linking agent) were added to the kneaded material and kneaded to obtain a highly saturated nitrile rubber composition.

Next, part of the obtained highly saturated nitrile rubber composition was cross-linked by pressing it using a mold of a vertical 15 cm, horizontal 15 cm, and depth 0.2 cm at a press pressure of 10 MPa and 170° C. for 20 minutes to obtain a sheet shaped primary cross-linked material, next, the obtained primary cross-linked material was transferred to a gear type oven and made to secondarily cross-link at 150° C. for 4 hours to thereby obtain sheet shaped cross-linked rubber. Further, separate from this, part of the obtained highly saturated nitrile rubber composition was cross-linked by pressing it using a mold of an outside diameter of 30 mm and a ring diameter of 3 mm at a press pressure of 5 MPa and 170° C. for 20 minutes to obtain an O-ring shaped primary cross-linked material, next, the obtained primary cross-linked material was transferred to a gear type oven and made to secondarily cross-link at 150° C. for 4 hours to thereby obtain O-ring shaped cross-linked rubber.

Further, using the obtained highly saturated nitrile rubber composition, the compound Mooney viscosity was evaluated according to the above-mentioned method. Further, using the sheet shaped cross-linked rubber and O-ring shaped cross-linked rubber, the storage elastic modulus, original state physical properties, liquefied gas resistance (fluorohydrocarbon resistance), compression set, and refrigerating machine oil resistance were evaluated using the above-mentioned methods. The results are shown in Table 1.

Example 2

Except for changing the amount of the carboxyl group-containing highly saturated nitrile rubber (A1-1) obtained in Synthesis Example 1 from 20 parts to 15 parts and the amount of the highly saturated nitrile rubber (A2-1) obtained in Synthesis Example 2 from 50 parts to 55 parts, the same procedure was followed as in Example 1 to prepare a highly saturated nitrile rubber composition, sheet shaped cross-linked rubber, and O-ring shaped cross-linked rubber and the same procedure was followed to evaluate them. The results are shown in Table 1.

Example 3

Except for changing the amount of the carboxyl group-containing highly saturated nitrile rubber (A1-1) obtained in Synthesis Example 1 from 20 parts to 16 parts and the amount of N990 carbon from 20 parts to 40 parts and for using, instead of the 50 parts of the highly saturated nitrile rubber (A2-1) obtained in Synthesis Example 2, 64 parts of the highly saturated nitrile rubber (A2-2) obtained in Synthesis Example 3 and, instead of 30 parts of Nylon 66, 20 parts of Nylon 1012 (product name "Hiprolon 11ESNNHL", made by Arkema, melting point 189° C.), the same procedure was followed as in Example 1 to prepare a highly saturated nitrile rubber composition, sheet shaped cross-linked rubber, and O-ring shaped cross-linked rubber and the same procedure was followed to evaluate them. The results are shown in Table 1. Note that, in Example 3, the kneading temperature by the twin-screw kneader was made 240° C.

Comparative Example 1

Except for not mixing in the carboxyl group-containing highly saturated nitrile rubber (A1-1) obtained in Synthesis Example 1 and for changing the amount of the highly saturated nitrile rubber (A2-1) obtained in Synthesis Example 2 from 50 parts to 70 parts, the same procedure was followed as in Example 1 to prepare a highly saturated nitrile rubber composition, sheet shaped cross-linked rubber, and O-ring shaped cross-linked rubber and the same procedure was followed to evaluate them. The results are shown in Table 1.

Comparative Example 2

Except for changing the amount of the carboxyl group-containing highly saturated nitrile rubber (A1-1) obtained in Synthesis Example 1 from 20 parts to 2 parts and the amount of the highly saturated nitrile rubber (A2-1) obtained in Synthesis Example 2 from 50 parts to 68 parts, the same procedure was followed as in Example 1 to prepare a highly saturated nitrile rubber composition, sheet shaped cross-linked rubber, and O-ring shaped cross-linked rubber and the same procedure was followed to evaluate them. The results are shown in Table 1.

Comparative Example 3

Except for changing the amount of the carboxyl group-containing highly saturated nitrile rubber (A1-1) obtained in Synthesis Example 1 from 20 parts to 15 parts, the amount of the highly saturated nitrile rubber (A2-1) obtained in Synthesis Example 2 from 50 parts to 82 parts, the amount of Nylon 66 from 30 parts to 3 parts, and the amount of N990 carbon from 20 parts to 100 parts, the same procedure was followed as in Example 1 to prepare highly saturated nitrile rubber composition, sheet shaped cross-linked rubber, and O-ring shaped cross-linked rubber and the same procedure was followed to evaluate them. The results are shown in Table 1.

Comparative Example 4

Except for changing the amount of the carboxyl group-containing highly saturated nitrile rubber (A1-1) obtained in Synthesis Example 1 from 20 parts to 30 parts, the amount of Nylon 66 from 30 parts to 15 parts, and the amount of N990 carbon from 20 parts to 40 parts, for using, instead of the 50 parts of the highly saturated nitrile rubber (A2-1) obtained in Synthesis Example 2, 45 parts of the highly saturated nitrile rubber (A2-2) obtained in Synthesis Example 3, for further adding 30 parts of an adipic acid ether ester-based plasticizer (product name "Adk cizer-RS-107", made by Adeka, plasticizer) when kneading at the Bambury mixer, and for not using triallyl isocyanurate, the same procedure was followed as in Example 1 to prepare a highly saturated nitrile rubber composition, sheet shaped cross-linked rubber, and O-ring shaped cross-linked rubber and the same procedure was followed to evaluate them. The results are shown in Table 1. Note that, in Comparative Example 4, the kneading temperature by the twin-screw kneader was made 240° C.

Comparative Example 5

Except for not using the carboxyl group-containing highly saturated nitrile rubber (A1-1) obtained in Synthesis Example 1 and Nylon 66, and for changing the amount of the highly saturated nitrile rubber (A2-1) obtained in Synthesis Example 2 from 50 parts to 100 parts and the amount of the N990 carbon from 20 parts to 100 parts, the same procedure was followed as in Example 1 to prepare a highly saturated nitrile rubber composition, sheet shaped cross-linked rubber, and O-ring shaped cross-linked rubber and the same procedure was followed to evaluate them. The results are shown in Table 1. Note that, in Comparative Example 5, a twin-screw kneader was not used for kneading. The highly saturated nitrile rubber (A2-1) was directly supplied to the Bambury mixer.

TABLE 1

|  |  |  | Example | | | Comparative Example | | | | |
| --- | --- | --- | --- | --- | --- | --- | --- | --- | --- | --- |
|  |  |  | 1 | 2 | 3 | 1 | 2 | 3 | 4 | 5 |
| Highly saturated nitrile rubber composition | | | | | | | | | | |
| Composition | Carboxyl group-containing highly saturated nitrile rubber (A1-1) | (parts) | 20 | 15 | 16 |  | 2 | 15 | 30 |  |
|  | Highly saturated nitrile rubber (A2-1) | (parts) | 50 | 55 |  | 70 | 68 | 82 |  | 100 |
|  | Highly saturated nitrile rubber (A2-2) | (parts) |  |  | 64 |  |  |  | 45 |  |
|  | Nylon 66 | (parts) | 30 | 30 |  | 30 | 30 | 3 | 15 |  |
|  | Nylon 1012 | (parts) |  |  | 20 |  |  |  |  |  |
|  | N990 carbon | (parts) | 20 | 20 | 40 | 20 | 20 | 100 | 40 | 100 |
|  | Adipic acid ether ester-based plasticizer | (parts) |  |  |  |  |  |  | 30 |  |
|  | 4,4'-di-(α,α-dimethylbenzyl)diphenylamine | (parts) | 1.5 | 1.5 | 1.5 | 1.5 | 1.5 | 1.5 | 1.5 | 1.5 |
|  | 1,3-bis(t-butylperoxyisopropyl)benzene 40% product | (parts) | 8 | 8 | 8 | 8 | 8 | 8 | 4 | 8 |
|  | Triallyl isocyanurate | (parts) | 4 | 4 | 4 | 4 | 4 | 4 |  | 4 |
| Kneading temperature of highly saturated nitrile rubber and polyamide resin | | (° C.) | 280 | 280 | 240 | 280 | 280 | 280 | 240 | No twin-screw kneading |
| Compound Mooney viscosity ($ML_{1+4}$, 100° C.) | | | 116 | 107 | 111 | 159 | 147 | 124 | 51 | 121 |

TABLE 1-continued

|  |  | Example | | | Comparative Example | | | | |
| --- | --- | --- | --- | --- | --- | --- | --- | --- | --- |
|  |  | 1 | 2 | 3 | 1 | 2 | 3 | 4 | 5 |
| Cross-linked rubber | | | | | | | | | |
| Storage elastic modulus E' | (MPa) | 14.5 | 13.4 | 13.1 | 17.6 | 15.5 | 12.8 | 3.01 | 12.5 |
| Evaluation | | | | | | | | | |
| Tensile strength | (MPa) | 37.8 | 35.1 | 29.8 | 13.2 | 15.2 | 19.1 | 18.6 | 20.4 |
| Elongation | (%) | 150 | 170 | 190 | 70 | 90 | 220 | 550 | 220 |
| 50% tensile stress | (MPa) | 17.7 | 16.3 | 15.9 | 10.3 | 9.98 | 3.51 | 1.51 | 4.17 |
| 100% tensile strength *[1] | (MPa) | 32.5 | 29.5 | 24.2 | — | — | 9.97 | 2.4 | 10.8 |
| Hardness (Duro A) |  | 85 | 84 | 81 | 90 | 88 | 85 | 58 | 82 |
| Liquefied gas resistance | (score) | 1 | 1 | 1 | 3 | 3 | 3 | 3 | 3 |
| Compression set (O-ring shape) | (%) | 37 | 36 | 39 | 65 | 63 | 49 | 88 | 47 |
| Volume change rate ΔV due to immersion in refrigerating machine oil | (%) | +0.3 | +0.5 | +0.5 | +0.6 | +0.5 | +1.9 | −12.9 | +2.2 |

*[1] For Comparative Example 1 and 2, the elongation was less 100%, so there was no 100% tensile stress.

From Table 1, a cross-linked rubber obtained by cross-linking the highly saturated nitrile rubber composition prescribed in the present invention and having a storage elastic modulus E' at 150° C. of 5 MPa or more was excellent in tensile strength, liquefied gas resistance (fluorohydrocarbon resistance), compression set resistance, and refrigerating machine oil resistance, further was excellent in hardness without it becoming too high, and simultaneously was sufficient in elongation, 50% tensile stress, and 100% tensile stress for practical use (Examples 1 to 3).

On the other hand, when not using the carboxyl group-containing highly saturated nitrile rubber (A1) or when the amount of the carboxyl group-containing saturated nitrile rubber (A1) was too small, the result was that the compound Mooney viscosity was high and the cross-linked rubber was inferior in tensile strength, liquefied gas resistance, compression set resistance, and refrigerating machine oil resistance (Comparative Examples 1 and 2).

When the amount of the polyamide resin (B) was too small, the result was that the cross-linked rubber was inferior in tensile strength, liquefied gas resistance, compression set resistance, and refrigerating machine oil resistance (Comparative Example 3).

Further, even when using the highly saturated nitrile rubber composition prescribed in the present invention, if the storage elastic modulus E' at 150° C. when made a cross-linked rubber is less than 5 MPa, the result was that the obtained cross-linked rubber was inferior in tensile strength, liquefied gas resistance, compression set resistance, and refrigerating machine oil resistance (Comparative Example 4).

Furthermore, when not using a carboxyl group-containing highly saturated nitrile rubber (A1) and polyamide resin (B), the result was that the cross-linked rubber was inferior in tensile strength, liquefied gas resistance, congression set resistance, and refrigerating machine oil resistance (Comparative Example 5).

The invention claimed is:

1. A cross-linked rubber for a liquefied gas seal obtained by cross-linking a highly saturated nitrile rubber composition comprising a carboxyl group-containing highly saturated nitrile rubber (A1) containing 15 to 60 wt % of α,β-ethylenically unsaturated nitrile monomer units and 1 to 60 wt % of α,β-ethylenically unsaturated dicarboxylic acid monoester monomer units and having an iodine value of 120 or less, a highly saturated nitrile rubber (A2) containing 15 to 60 wt % of α,β-ethylenically unsaturated nitrile monomer units and 0.9 wt % or less of α,β-ethylenically unsaturated dicarboxylic acid monoester monomer units, and having an iodine value of 120 or less, a polyamide resin (B) having a melting point of 150° C. or more, a cross-linking agent (C), and a co-cross-linking agent, wherein, in the highly saturated nitrile rubber composition, ratios of content of the carboxyl group-containing highly saturated nitrile rubber (A1), the highly saturated nitrile rubber (A2), and the polyamide resin (B) are a weight ratio of (A1):(A2) of 5:95 to 95:5 and a weight ratio of ((A1)+(A2)):(B) of 95:5 to 50:50, wherein the cross-linked rubber has a storage elastic modulus E' at 150° C. is 7 MPa or more, and wherein the co-cross-linking agent is an isocyanurate.

2. The cross-linked rubber for sealing liquefied gas according to claim 1, wherein, in the highly saturated nitrile rubber composition, the ratio of content of the cross-linking agent (C) is 0.1 to 30 parts by weight with respect to 100 parts by weight of the total of the carboxyl group-containing highly saturated nitrile rubber (A1) and the highly saturated nitrile rubber (A2).

3. The cross-linked rubber for sealing liquefied gas according to claim 1, wherein the cross-linking agent (C) is an organoperoxide cross-linking agent.

4. The cross-linked rubber for sealing liquefied gas according to claim 1, wherein the highly saturated nitrile rubber composition is obtained by kneading the carboxyl group-containing highly saturated nitrile rubber (A1), the highly saturated nitrile rubber (A2), and the polyamide resin (B) at a temperature of 180° C. or more.

5. The cross-linked rubber for sealing liquefied gas according to claim 1, wherein the highly saturated nitrile rubber composition further comprises a filler.

6. The cross-linked rubber for sealing liquefied gas according to claim 5, wherein the filler is carbon black.

7. The cross-linked rubber for sealing liquefied gas according to claim 6, wherein the carbon black has an average particle size of 0.01 to 5 μm.

8. A liquefied gas seal member comprised of cross-linked rubber according claim 1.

9. The cross-linked rubber for sealing liquefied gas according to claim 1, wherein the isocyanurate is triallyl isocyanurate.

10. The cross-linked rubber for sealing liquefied gas according to claim 1, wherein the content of the co-cross-linking agent is 0.5 to 20 parts by weight with respect to 100 parts by weight of the total of the carboxyl group-containing highly saturated nitrile rubber (A1), the highly saturated nitrile rubber (A2), and polyamide resin (B).

11. The cross-linked rubber for sealing liquefied gas according to claim 10, wherein the content is 1 to 15 parts by weight.

12. The cross-linked rubber for sealing liquefied gas according to claim 10, wherein the content is 1.5 to 10 parts by weight.

13. The cross-linked rubber for sealing liquefied gas according to claim 1, wherein the co-cross-linking agent is a compound selected from the group consisting of triallyl isocyanurate and trimethallyl isocyanurate.

\* \* \* \* \*